US008711746B2

(12) United States Patent
Zechlin et al.

(10) Patent No.: US 8,711,746 B2
(45) Date of Patent: Apr. 29, 2014

(54) METHOD, APPARATUS OR COMPUTER PROGRAM FOR CHANGING FROM SCHEDULED TO UNSCHEDULED COMMUNICATION MODES

(75) Inventors: Christian Zechlin, Herne (DE); Eugen Palnau, Dortmund (DE)

(73) Assignee: Nokia Corporation, Espoo (FI)

( * ) Notice: Subject to any disclaimer, the term of this patent is extended or adjusted under 35 U.S.C. 154(b) by 296 days.

(21) Appl. No.: 12/445,448

(22) PCT Filed: Oct. 13, 2006

(86) PCT No.: PCT/IB2006/003598
§ 371 (c)(1),
(2), (4) Date: May 27, 2010

(87) PCT Pub. No.: WO2008/044089
PCT Pub. Date: Apr. 17, 2008

(65) Prior Publication Data
US 2011/0032882 A1    Feb. 10, 2011

(51) Int. Cl.
*H04W 52/02*    (2009.01)
(52) U.S. Cl.
CPC .................... *H04W 52/0232* (2013.01)
USPC ........... 370/311; 370/310; 370/313; 370/314; 370/329; 370/345; 455/569.1; 455/574
(58) Field of Classification Search
USPC ......... 370/310, 311, 313, 314, 329, 345, 347; 455/569.1, 573, 574
See application file for complete search history.

(56) References Cited

U.S. PATENT DOCUMENTS

| 6,493,560 | B1 | 12/2002 | Guan et al. |
| 6,807,159 | B1 | 10/2004 | Shorey et al. |
| 2001/0019956 | A1* | 9/2001 | Tada .............................. 455/434 |
| 2002/0105970 | A1* | 8/2002 | Shvodian ...................... 370/468 |
| 2004/0233879 | A1* | 11/2004 | Ascheuer et al. ............. 370/338 |
| 2005/0054389 | A1 | 3/2005 | Lee et al. |
| 2005/0169201 | A1 | 8/2005 | Huylebroeck |
| 2006/0050670 | A1 | 3/2006 | Hillyard et al. |

FOREIGN PATENT DOCUMENTS

| EP | 1113690 A2 | 7/2001 |
| EP | 1473951 A2 | 11/2004 |
| EP | 1560383 A2 | 8/2005 |

OTHER PUBLICATIONS

Chakraborty, Indraneel et al. "Policies for Increasing Throughput and Decreasing Power Consumption in Bluetooth MAC." 2000.*
International Search Report and Written Opinion received for corresponding Patent Cooperation Treaty Application No. PCT/IB2006/003598, dated Jul. 16, 2007, 14 pages.
Xiang, Li, et al., "A Sniff Scheduling Policy for Power Saving in Bluetooth Piconet", Proceedings of the 11th International Conference on Parallel and Distributed Systems, 2005, 6 pages.

(Continued)

*Primary Examiner* — Dang Ton
*Assistant Examiner* — Robert M Morlan
(74) *Attorney, Agent, or Firm* — Locke Lord LLP

(57) ABSTRACT

A method comprising: while in a first communication mode that uses scheduled communication, detecting when a number of packets communicated in an interval exceeds a threshold; and if the number of packets communicated in the interval exceeds the threshold, changing the communication mode from the first communication mode to a second communication mode that uses unscheduled communication and if the number of packets communicated in the interval does not exceed the threshold, remaining in the first communication mode.

20 Claims, 3 Drawing Sheets

(56) References Cited

OTHER PUBLICATIONS

Office Action received in corresponding Chinese Application No. 200680056090.X, Mar. 23, 2011, 6 pages.
Extended European Search Report received for corresponding European Patent Application No. 06821062.4, Dec. 8, 2009, 6 pages.
Office action received for corresponding European Patent Application No. 06821062.4, Mar. 28, 2011, 5 pages.
Lin, Ting-Yu, et al., "An Adaptive Sniff Scheduling Scheme for Power Saving in Bluetooth", IEEE Wireless Communications, vol. 9, No. 6, Dec. 1, 2002, pp. 92-103.
Chakraborty, et al.; Policies for Increasing Throughput and Decreasing Power Consumption in Bluetooth MAC; IEEE International Conference of Personal Wireless Communications; (2000); pp. 7-11.
Chinese Patent Office for Chinese Patent Application No. 200680056090.X dated Sep. 5, 2012, with English language summary.

* cited by examiner

METHOD, APPARATUS OR COMPUTER PROGRAM FOR CHANGING FROM SCHEDULED TO UNSCHEDULED COMMUNICATION MODES

RELATED APPLICATION

This application was originally filed as PCT Application No. PCT/IB2006/003598 filed Oct. 13, 2006.

FIELD OF THE INVENTION

Embodiments of the present invention relate to a method, apparatus or computer program for changing from scheduled to unscheduled communication modes. In particular, they relate to a method, apparatus or computer program for exiting a Bluetooth sniff mode.

BACKGROUND TO THE INVENTION

In a Bluetooth 'sniff mode', asynchronous communication occurs according to a schedule negotiated between a master device and Slave device.

The schedule specifies periodically occurring sniff anchor points at which communication windows are positioned. Asynchronous communication between the Master and Slave only occurs during a window.

A window has a predetermined minimum duration that is extended if there is communication in the preceding period Sniff_Timeout.

Although data may be exchanged between Master and Slave while the sniff mode is on-going it is not as efficient as data communication in an active mode that has unscheduled communication. Delays in transmission/reception arising, for example, from delays in higher layers will result in a window closing because the period Sniff_Timeout has expired for lack of communication. A window may therefore close before a data transfer has completed and a number of successive, periodic windows may be required for data transfer.

One option for avoiding this problem would be to exit the sniff mode immediately when data communication is required or detected. However, entering and exiting the sniff mode has a messaging overhead.

BRIEF DESCRIPTION OF THE INVENTION

According to one embodiment of the invention there is provided a method comprising: while in a first communication mode that uses scheduled communication, detecting when a number of packets communicated in an interval exceeds a threshold; and if the number of packets communicated in the interval exceeds the threshold, changing the communication mode from the first communication mode to a second communication mode that uses unscheduled communication and if the number of packets communicated in the interval does not exceed the threshold, remaining in the first communication mode.

This provides the advantage that the overhead associated with a mode change and the disadvantage of higher power consumption is avoided unless the data communication exceeds a specified threshold. Data communication in the less efficient but power saving first mode is endured while the threshold is not exceeded. However, once the threshold is exceeded the communication mode switches to the more efficient but power hungry second mode. This results in significant power savings.

According to another embodiment of the invention there is provided an apparatus comprising: radio transceiver circuitry operable according to a schedule when the apparatus is in a first communication mode and operable without a schedule when the apparatus is in a second communication mode; a mechanism arranged to detect when a number of packets communicated in an interval exceeds a threshold; circuitry arranged to change a communication mode of the apparatus from the first communication mode to the second communication mode if the detected number of packets communicated in the interval exceeds the threshold and arranged to maintain the first communication mode if the detected number of packets communicated in the interval does not exceed the threshold.

According to another embodiment of the invention there is provided a computer program comprising computer program instructions for: starting a timeout period after a communication; counting communications during the timeout period; determining when the count of communications during the timeout period exceeds a threshold; and enabling exit from a first communication mode that uses scheduled communication to enter a second communication mode that uses unscheduled communication if the count of communications during the timeout exceeds a threshold and for enabling maintenance of the first communication mode if the count of communications during the timeout period does not exceed the threshold.

According to another embodiment of the invention there is provided a method of controlling a low power radio transceiver comprising: delaying, after a commencement of data communication, an exit from a scheduled communication mode until a predetermined data transfer condition is satisfied.

According to another embodiment of the invention there is provided a low power radio transceiver device comprising: a mechanism arranged to delay, after a commencement of data communication, an exit from a scheduled communication mode until a predetermined data transfer condition is satisfied.

According to another embodiment of the invention there is provided a computer program comprising computer program instructions for: delaying, after detection of a commencement of data communication, an exit from a scheduled communication mode until a predetermined data transfer condition is satisfied.

BRIEF DESCRIPTION OF THE DRAWINGS

For a better understanding of the present invention reference will now be made by way of example only to the accompanying drawings in which.

DOCUMENTS INCORPORATED BY REFERENCE

The current version of the Specification of the Bluetooth System is v2.0 (4 Nov. 2004) which is available from www.Bluetooth.org.

The following portions of the Specification are incorporated by reference:

All sections describing the Sniff Mode including: Architecture, Communication Topology, 4.2.5 (p. 129); Baseband Specification, Link Controller Operation, 8.7 and 8.7.1 (p. 349 ff.); Link Manager Protocol, Procedure Rules, 4.5.3.1 and 4.5.3.2 (p. 445 ff.); Message Sequence Charts, Sniff, Hold and Park, 6.1 (p. 821); and Host Controller Interface Functional Specification, HCI Commands and Events, 7.2.2 and 7.2.3 (p. 615 ff.).

Sections describing the architecture and control of a Bluetooth piconet including: Architecture-Communication Topology 4.1.

Sections describing the physical channels including: Radio Specification, Frequency Bands and Channel Arrangement, 2; Radio Specification, Transmitter Characteristics, 3; and Baseband Specification, Physical Channels, 2.1, 2.2 ff.

Sections describing the characteristics of asynchronous connection-oriented (ACL) logical transport and synchronous connection-oriented (SCO) logical transport e.g. Architecture, Data Transport Architecture, 3.5.4, 3.5.5, 3.5.6

DETAILED DESCRIPTION OF EMBODIMENTS OF THE INVENTION

Figure 1:
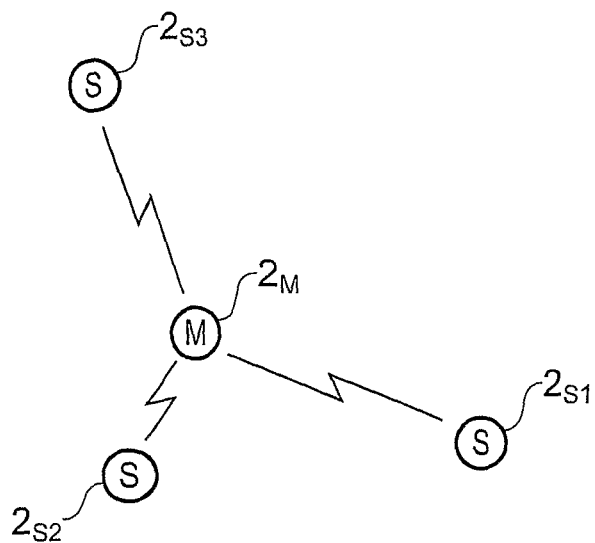
FIG. 1 illustrates a low-power radio frequency network comprising a plurality of transceiver devices.

FIG. 1 illustrates a low-power radio frequency network 1 comprising a plurality of transceiver devices. In this example, the transceiver devices communicate via the piconet 1 using the Bluetooth Protocol which is currently defined in The Specification of the Bluetooth System v2.0 (4 November 2004).

The piconet 1 is an ad-hoc radio communications network controlled by a Master device $2_M$, and including the Master device $2_M$ and up to seven Slave devices $2_{S1}$, $2_{S2}$, $2_{S3}$. Communications in the piconet 1 occur as a sequence of packet data units (PDU).

The devices 2 of the piconet 1 are synchronized to a common time reference determined by the native Bluetooth clock of the Master device $2_M$. The common time reference 20 is divided into a series of time division duplex (TDD) frames. Each TDD frame comprises two time slots.

A single physical communication channel exists within the piconet 1. This communication channel operates in a TDD fashion. It includes a downlink channel from the Master in a first slot of a TDD frame such that only the Master can begin transmission of a packet data unit (PDU) in the first slot. It includes an uplink channel to the Master in the second slot of the TDD frame such that only the Slave can begin transmission of a PDU in the second slot. The communication channel may be allocated to a particular Slave $2_{SN}$, by having the Master $2_M$, poll that Slave $2_{SN}$, by sending a PDU addressed to it, in the first time slot of a TDD frame.

A PDU comprises a header and a payload. An access code of the header identifies the Master of the piconet and an address within the header identifies the device addressed. The access code within the header is also used for maintaining synchronization to the common time reference at each of the devices 2 within the piconet 1. Accurate time synchronization is necessary as the piconet 1, according to the Bluetooth standard, uses synchronized fast frequency hopping of transmission/reception frequencies and the Master and Slaves hop together.

The Bluetooth devices 2 operate in the 2.4 GHz ISM band and with a transmission power between approximately 1 mW (0 dBm) and 100 mW (20 dBm).

Figure 2:
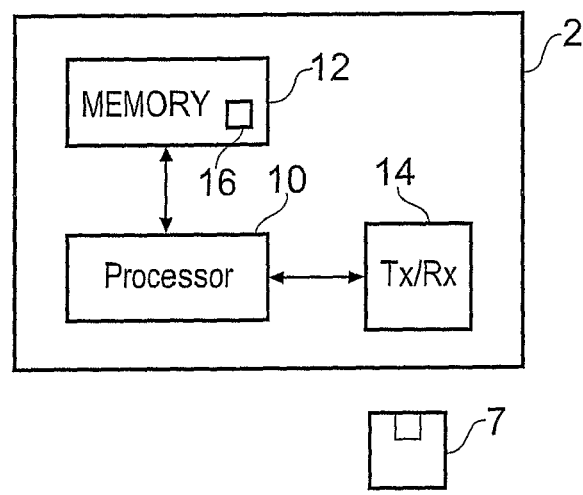
FIG. 2 schematically illustrates a Bluetooth transceiver device that is operable as a Master M or Slave S in a Bluetooth piconet.

FIG. 2 schematically illustrates a Bluetooth transceiver device 2 that is operable as a Master M or Slave S of a Bluetooth piconet. The transceiver device 2 may, for example, be a chip or chipset for integration into a host device, a module for attachment to a host device or a host device.

The Bluetooth transceiver device 2 comprises a processor 10, a memory 12 and radio transceiver circuitry 14. The processor 10 is connected to read from and write to the memory 12 and connected to exchange data with the radio transceiver circuitry 14.

The memory 12 includes computer program instructions 16 which when loaded into the processor 10 control the operation of the device 2. The computer program instructions 16 provide the logic and routines that enables the electronic device to perform the process illustrated in FIG. 5.

The computer program instructions may arrive at the transceiver device 2 via an electromagnetic carrier signal or be copied from a physical entity 7 such as a computer program product, a memory device or a record medium such as a CD-ROM or DVD.

Figure 3:
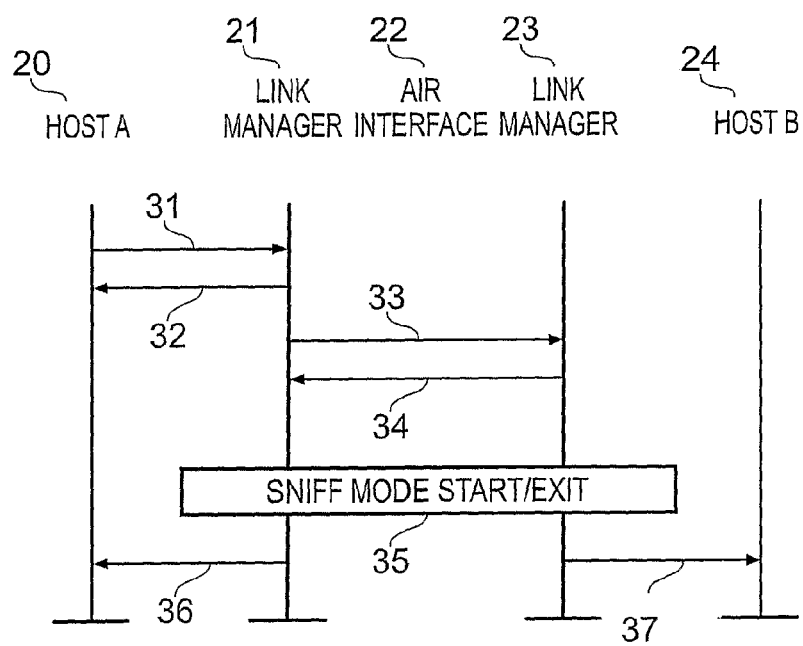
FIG. 3 is a signaling diagram that illustrates how a sniff mode in entered from an active mode and how a sniff mode is exited to an active mode.

FIG. 3 is a signaling diagram that illustrates how a sniff mode is entered from an active mode and how a sniff mode is exited to an active mode.

A Host A 20, which may be the Bluetooth device 2 or an apparatus carrying the Bluetooth device 2, instructs the Link Manager 21 of the originating Bluetooth device 2 to start the Sniff Mode using message 31. This message 31 includes sniff parameters that define the sniff mode. The receipt of this message is acknowledged by returning message 32. The Link Manager 21 communicates with a Link Manager 23 of a recipient Bluetooth device 2 across an air interface 22 by sending a request PDU 33 and receiving in reply acceptance PDU 34. The request PDU 33 includes the sniff parameters Sniff_Interval, Sniff_Attempt and Sniff_Timeout. The Link Managers 21, 23 respond by entering sniff mode and then informing their respective hosts 20, 24 via messages 36, 37. The message exchange for exiting the sniff mode is similar although the message 31 and request PDU 33 do not contain the sniff parameters. The procedures are described in detail in the Bluetooth Specification, Message Sequence Charts, Sniff, Hold, Park. 6.1.

In an 'active mode', asynchronous communication occurs on an ad-hoc basis without a schedule. A Slave device may be polled by the Master device in any TDD frame, although certain frames may be reserved for isochronous communication and avoided. When a Slave is in the active mode, the Master has on-demand communication. A Slave device in active mode must always be ready to receive a poll in slots assigned to asynchronous reception. Consequently, the radio transceiver circuitry must be permanently energized in the asynchronous reception slots which results in power consumption.

In a 'sniff mode', asynchronous communication occurs according to a schedule agreed between two devices when the sniff mode was entered by those devices. There are only certain predetermined TDD frames where a Slave device, in sniff mode, may be successfully polled by the Master device. As a consequence, a Slave device in sniff mode must not always be ready to receive a poll in asynchronous reception slots but only ready at specific predetermined times (sniff anchor points). Consequently, the radio transceiver circuitry may be switched off until those predetermined times. As the sniff anchor points occur periodically, the radio transceiver circuitry is intermittently activated. The 'duty cycle' of the Slave's activity in the sniff mode, compared to the active mode, is therefore reduced i.e. the Slave is active for a smaller proportion of the available TDD frames.

Figure 4:
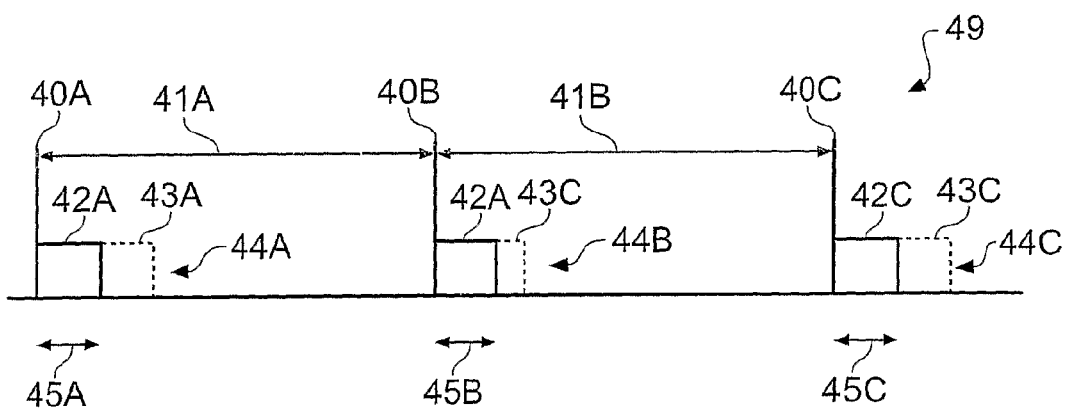
FIG. 4 schematically illustrates a schedule for a sniff mode.

FIG. 4 schematically illustrates the schedule 49 for a sniff mode. There is a plurality of equally spaced sniff anchor points 40A, 40B, 40C. The anchor points occur periodically with a period Sniff_Interval separating them as indicated by references 41A and 41B. According to the schedule, a Slave device only listens at a reduced number of specified time slots defined by the windows 44 beginning at the sniff anchor points 40.

After a Slave and Master have performed the signaling of FIG. 3, a schedule 49 for communications during the sniff mode will have been defined by the sniff parameters. A window 44 is attached to each anchor point. The window 44 indicates the period during which the Slave device switches on its transceiver circuitry to receive PDUs from the Master and the period during which the Master can successfully send PDUs to the Slave. Outside the window the transceiver circuitry is deactivated except for isochronous communications. The windows are positioned to avoid any 'circuit switched' isochronous communications.

The window 44 comprises a first portion 42 of fixed duration specified by the value of Sniff_Attempt. This is the minimum duration of the window 44.

The window 44 may comprise a second portion 43 of variable duration which is dependent upon Sniff_Timeout. The window 44 will be extended beyond the first portion 42 if the Slave has received/transmitted a PDU in the preceding period Sniff_Timeout.

The window 44 therefore has a minimum duration but is also adaptive, extending its duration if the Slave is involved in on-going communications.

Figure 5:
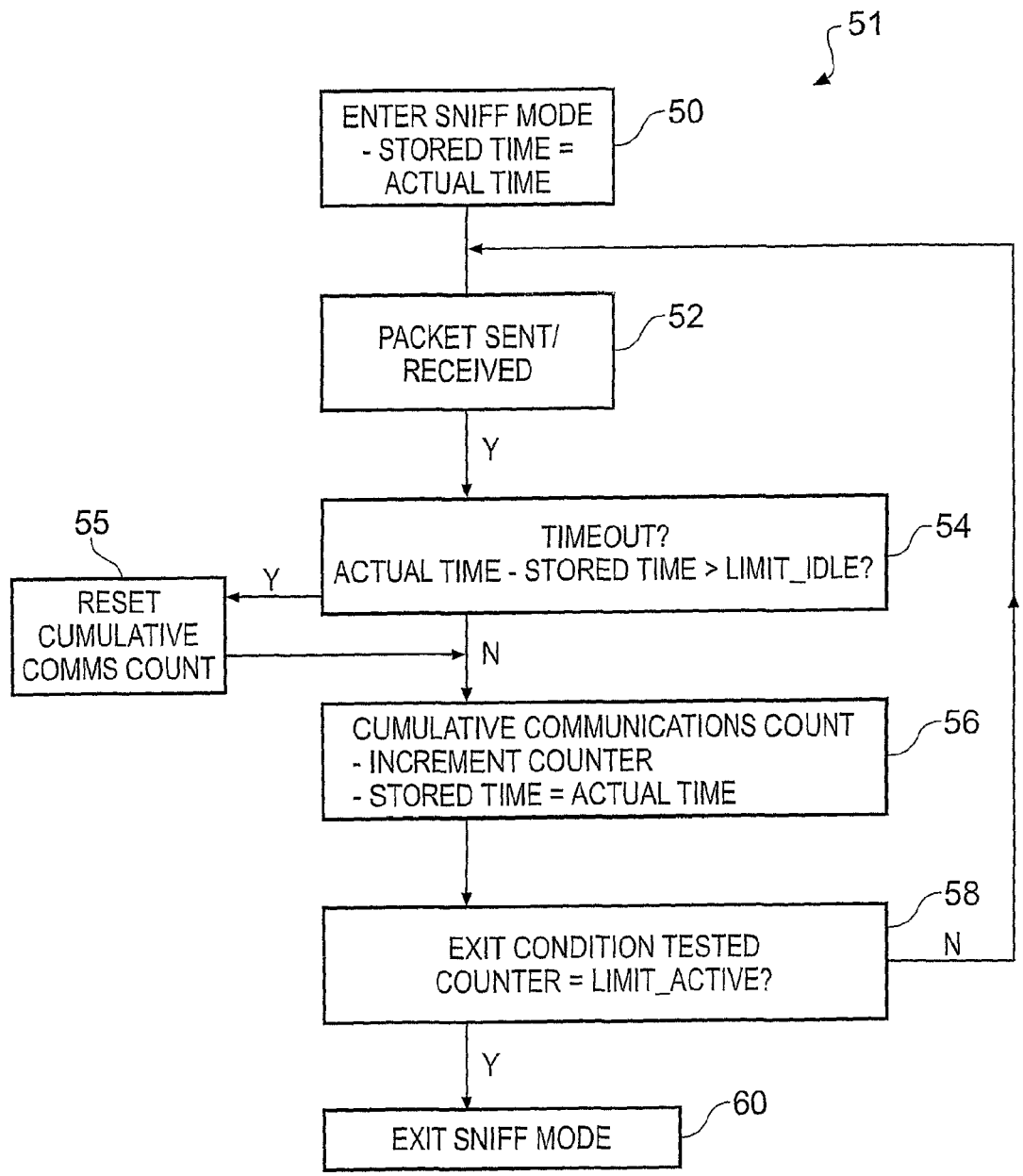
FIG. 5 schematically illustrates a process for conditionally exiting a sniff mode.

FIG. 5 schematically illustrates a process 51 for conditionally exiting the sniff mode. The condition that must be satisfied is that a specified number LIMIT_ACTIVE of data packets are received/sent within a specified period of time LIMIT_IDLE. The values LIMIT_ACTIVE and LIMIT_IDLE may be programmable or permanently fixed.

The Slave does not exit sniff mode or take steps to exit sniff mode immediately when data packets are transmitted or received below a threshold. The threshold for exiting sniff mode is that there is on-going communication.

The Slave does exit sniff mode or take steps to exit the sniff mode only when the specified number LIMIT_ACTIVE of data packets are transmitted or received during a specified time LIMIT_IDLE.

The blocks illustrated in FIG. 5 may be steps in a method or routines or code sections within a computer program.

At block 50, entry to the sniff mode is detected. The variable STORED TIME is set to the actual time ACTUAL TIME. The value of STORED TIME indicates the time at which a packet was last received/sent.

Next at block 52, if data communication is detected the process proceeds to block 54 otherwise to loops around to block 52. Thus the process only proceeds when a data communication occurs. Data communication may be detected by detecting the transmission or reception of an L2CAP packet.

At block 54, a time out condition is tested. This timeout condition ensures that only communications within a timeout period are used to augment the cumulative communication count at block 56. Block 54 tests whether the actual time ACTUAL TIME minus the current value of STORED TIME is greater than LIMIT_IDLE. If it is, a timeout has occurred and the process branches to block 55 where a cumulative communications counter is reset before the process moves on to block 56. If the inequality is not satisfied, the process moves on to block 56.

At block 56, the cumulative communication counter is incremented and the value of STORED TIME is set equal to the value ACTUAL TIME.

Next at block 58, the condition for exiting the sniff mode is tested. If the value of the cumulative communications count now equals the value LIMIT_ACTIVE then the process moves to block 60 where the sniff mode is exited and the active mode entered. If the value of the cumulative communications counter does not now equal the value LIMIT_ACTIVE then the process returns to block 52 to wait for the next communication.

Although data may be exchanged between Master and Slave while the sniff mode is on-going it is not as efficient as data communication in the active mode. Typically the window 44 closes before a data transfer has completed due to inherent delays in transmission/reception and a number of windows 44 may be required for data transfer. The delays in transmission/reception may arise from delays in higher layers that result in the window 44 closing because the adaptive portion 43A is not extended because of delayed communications. However, switching from sniff mode to active mode has a signaling overhead.

The process illustrated in FIG. 5 has the advantage that the overhead associated with a mode change is avoided unless the data communication exceeds a specified threshold. Data communication in the less efficient sniff mode is endured while the threshold is not exceeded. However, once the threshold is exceeded the communication mode switches to the more efficient active mode.

In addition it is possible to perform efficient data transfer without renegotiating sniff parameters.

It is mandatory when a Bluetooth accessory is used with a mobile cellular telephone, that certain indications (battery status, network status, etc) are sent from the phone to the Bluetooth accessory. The mobile cellular telephone may send these indications to the accessory as unsolicited status codes and not expect a response from the accessory. The indications may be sent regularly perhaps as much as every 10 s.

The values of LIMIT_IDLE and LIMIT_ACTIVE may be set so that communications of this type do not cause the sniff mode to be exited. The data would be transmitted in the sniff mode. As the data traffic is light and not too frequent the balance of advantages (power saving) to disadvantages (reduced data throughput) associated with using the sniff mode for data communication do not outweigh the balance of advantages (greater data throughput) to disadvantages (more power consumption) associated with changing to use the active mode for data communication. As an example only, the value of LIMIT_IDLE could be 100 ms and the value of LIMIT_ACTIVE could be 3. The value of LIMIT_IDLE is typically chosen so that there is not a perceptible delay in data transfer to a user, it is generally a value less than 500 ms and greater than 5 ms, it may however be less than 100 ms and/or greater than 20 ms.

During SIM Access profile connection, a mobile telephone checks every 22 s whether the SIM card is still present by sending a SAP request and awaiting a SAP response.

The values of LIMIT_IDLE and LIMIT_ACTIVE may be set so that communications of this type do not cause the sniff mode to be exited. The data would be transmitted in the sniff mode. As the data traffic is light and not too frequent the balance of advantages (power saving) to disadvantages (reduced data throughput) associated with using the sniff mode for data communication do not outweigh the balance of advantages (greater data throughput) to disadvantages (more power consumption) associated with changing to use the active mode for data communication Although embodiments of the present invention have been described in the preceding paragraphs with reference to various examples, it should be appreciated that modifications to the examples given can be made without departing from the scope of the invention as claimed.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
   detecting, by an apparatus, while in a first communication mode that uses scheduled communication windows that are a sequence of a plurality of periodic windows of variable duration, with each periodic window including a first occurring portion having a first occurring interval and a second occurring portion having a second occurring interval, with communications during the second occurring portion being dependent upon preceding communications during the first portion, with a communication device in the periodic windows, when a number of packets communicated in the first occurring interval within the first portion, exceeds a threshold;
   changing, by the apparatus, the communication mode from the first communication mode to a second communication mode that uses unscheduled communication with the communication device, if the number of packets communicated in the first occurring interval within the first occurring portion exceeds the threshold, and
   remaining, by the apparatus, in the first communication mode, if the number of packets communicated in the first occurring interval within the first occurring portion does not exceed the threshold.

2. A method according to claim 1, further comprising: while in the first communications mode, intermittently activating communication circuitry according to a schedule.

3. A method according to claim 1, wherein the first communication mode uses scheduled windows for communication.

4. A method according to claim 3, wherein the scheduled windows have starting positions that occur periodically.

5. A method according to claim 3, wherein the windows are positioned to avoid periods reserved for synchronous communication.

6. A method according to claim 3, wherein the windows have a duration comprising a constant component.

7. A method according to claim 6, wherein adjacent windows are separated by a period greater than the constant component.

8. A method according to claim 3, wherein asynchronous communication is prevented outside the scheduled windows.

9. A method according to claim 3, wherein communication circuitry is activated during the scheduled windows and deactivated for at least part of the time lying outside the scheduled windows.

10. A method according to claim 1, wherein in the first communication mode, communication is allowed for only a limited duration following a preceding communication.

11. A method according to claim 1, wherein in the first communication mode has a reduced duty cycle compared to the second communication mode.

12. A method according to claim 1, wherein in the second communication mode provides on-demand communication of data.

13. A method according to claim 1, wherein in the second communication mode communication circuitry is activated for an increased number of reception slots compared to the first communication mode.

14. A method according to claim 1, wherein the interval and the threshold are programmable.

15. An apparatus comprising:
    radio transceiver circuitry configured to operate according to a schedule with a communication device when the apparatus is in a first communication mode that uses scheduled communication windows that are a sequence of a plurality of periodic windows of variable duration including a first occurring portion having a first occurring interval and a second occurring portion having a second occurring interval, with communications during the second occurring portion being dependent upon preceding communications during the first occurring portion, with the communication device in the periodic windows, and configured to operate without a schedule with the communication device when the apparatus is in a second communication mode;
    a mechanism configured to detect when a number of packets communicated with the communication device in the first occurring interval within the first portion, exceeds a threshold; and
    circuitry configured to change a communication mode from the first communication mode to the second communication mode if the detected number of packets communicated in the first occurring interval within the first occurring portion, exceeds the threshold and configured to maintain the first communication mode if the detected number of packets communicated in the first occurring interval within the first occurring portion, does not exceed the threshold.

16. An apparatus according to claim 15, wherein the first communication mode uses scheduled windows for communication.

17. An apparatus according to claim 16, wherein the radio transceiver circuitry is activated during the scheduled windows and deactivated for at least part of the time lying outside the scheduled windows.

18. A non-transitory computer-readable medium encoded with instructions that, when executed by a computer in an apparatus, perform steps, comprising:
    starting, in the apparatus, a timeout period in a first occurring portion of a periodic window in a sequence of a plurality of periodic windows, the periodic window including the first occurring portion having a first occurring interval and a second occurring portion having a second occurring interval, with communications during the second occurring portion being dependent upon preceding communications during the first occurring portion after a communication with a communication device;
    counting, by the apparatus, communications with the communication device during the timeout period in the first occurring interval within the first occurring portion;
    determining, by the apparatus, when the count of communications during the timeout period in the first occurring interval within the first occurring portion, exceeds a threshold; and
    enabling exit from a first communication mode that uses scheduled communication windows of variable duration dependent upon preceding communications during the first occurring interval within the first occurring portion, with the communication device in the periodic windows, to enter a second communication mode that uses unscheduled communication with the communication device, if the count of communications during the timeout period in the first occurring interval within the first occurring portion, exceeds a threshold and enabling maintenance of the first communication mode if the count of communications during the timeout period in the first occurring interval within the first occurring portion, does not exceed the threshold.

19. A method of controlling a low power radio transceiver comprising:
commencing, by the radio transceiver, a scheduled communication mode that uses scheduled communication windows that are a sequence of a plurality of periodic windows of variable duration including a first occurring portion having a first occurring interval and a second occurring portion having a second occurring interval, with communications during the second occurring portion being dependent upon preceding communications during the first occurring portion, with a communication device in the periodic windows; and
delaying, by the radio transceiver, after the commencement of data communication in the scheduled communication mode with the communication device, an exit from the scheduled communication mode to an unscheduled communication mode with the communication device, until a predetermined data transfer condition is satisfied wherein a number of packets communicated in the first occurring interval within the first occurring portion exceeds a threshold.

20. A radio transceiver apparatus comprising:
circuitry configured to commence data communication according to a schedule with a communication device when the radio transceiver apparatus is in a scheduled communication mode that uses scheduled communication windows that are a sequence of a plurality of periodic windows of variable duration including a first occurring portion having a first occurring interval and a second occurring portion having a second occurring interval, with communications during the second occurring portion being dependent upon preceding communications during the first occurring portion, with the communication device in the periodic windows;
a mechanism configured to delay, after the commencement of data communication with a the communication device, an exit from the scheduled communication mode to an unscheduled communication mode with the communication device, until a predetermined data transfer condition is satisfied wherein a number of packets communicated in the first occurring interval within the first occurring portion exceeds a threshold.

* * * * *